Figure 1:
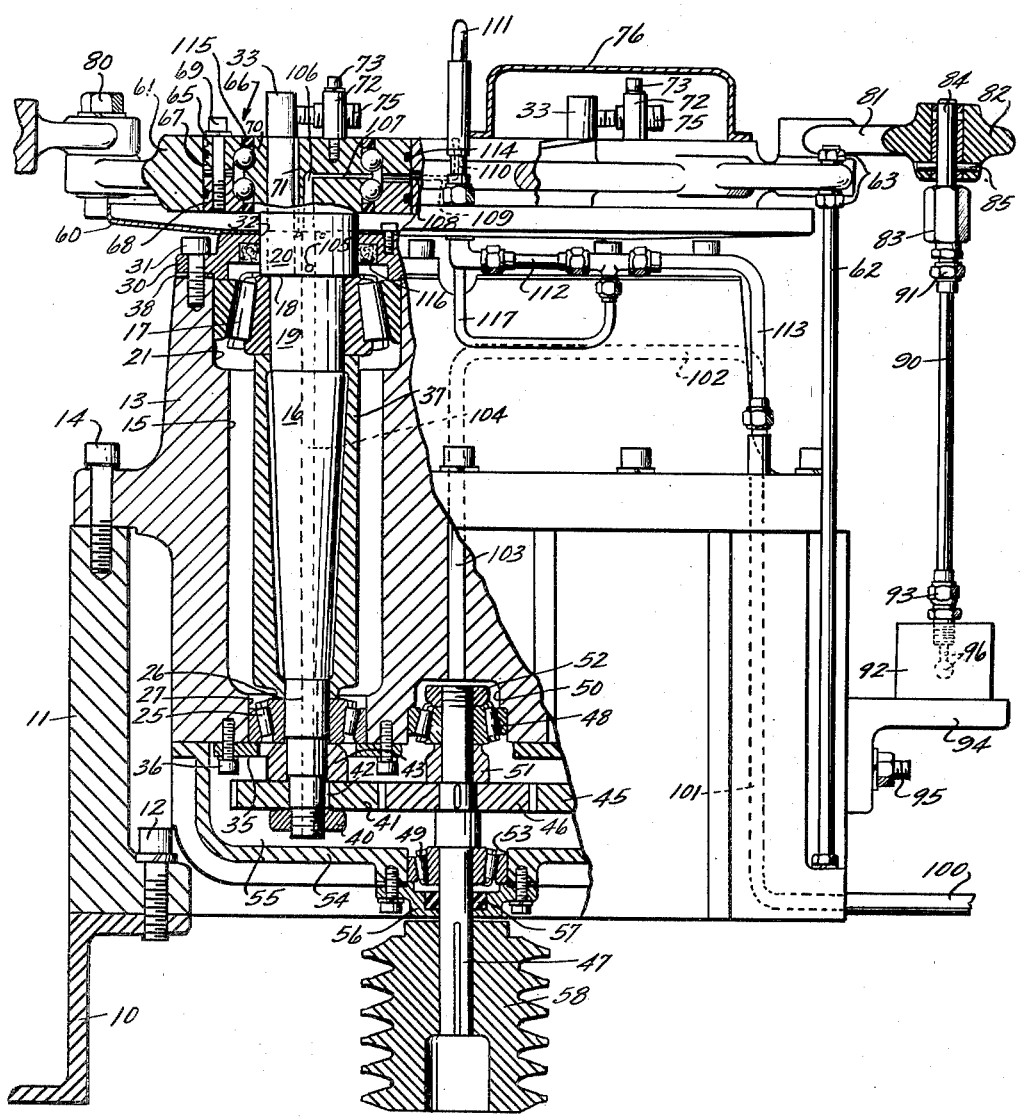

Aug. 1, 1950  E. C. HARTLEY  2,517,204
VIBRATION TEST UNIT FOR TUBE COUPLINGS
Filed Nov. 18, 1948  2 Sheets-Sheet 1

INVENTOR.
EMMETT C. HARTLEY
BY Wade Koontz
ATTORNEY
H. H. Losche and
AGENT

Aug. 1, 1950       E. C. HARTLEY       2,517,204
VIBRATION TEST UNIT FOR TUBE COUPLINGS

Filed Nov. 18, 1948       2 Sheets-Sheet 2

INVENTOR.
EMMETT C. HARTLEY
BY Wade Koonty
ATTORNEY
H. H. Losch and
AGENT

Patented Aug. 1, 1950

2,517,204

UNITED STATES PATENT OFFICE 2,517,204

VIBRATION TEST UNIT FOR TUBE COUPLINGS

Emmett C. Hartley, Euclid, Ohio, assignor to the United States of America as represented by the Secretary of the United States Air Force Application November 18, 1948, Serial No. 60,798

6 Claims. (Cl. 73—93)

This invention relates to vibration test units and more particularly to a mechanism for testing a plurality of assorted sizes of specimen fluid conduits and fluid couplings under pressure, or rods and cables, for endurance under conditions of vibration by imposing stress reversals in all radial directions on the test specimens.

It has become general practice to test certain items of equipment to be used on machinery to determine the expected life of these items in actual use and to aid in the research of improving them. Where such items are subjected to vibration, the life of these items is largely dependent on the amount of vibration that the items are capable of withstanding before breaking or becoming unsatisfactory in service. Since, in actual practice, vibration movements are irregular and cause stress reversals on certain items, many attempts have been made to duplicate such vibration by specially designed machines but most of these machines only produce movement or vibration in one direction which fall short of providing an indication of dependable accuracy of the average expected usable life of the tested item under normal conditions of use.

In accordance with the present invention, a machine has been provided for producing vibration on specimen elements attachable thereto in which one end each of the specimen elements is subjected to an eccentric motion while the other ends thereof remain stationary and the degree of eccentricity is adjustable. The items of major concern in fatigue tests are tubing and tubing couplings used very extensively for engine oil lines, air lines, hydraulic lines, fuel lines, etc., and this invention is illustrated using tubing and tubing coupling specimen elements although the device may be used for testing various rods, bars, cables and similar items.

It is a primary object of this invention to provide a mechanism for vibrating specimen mechanical elements to determine the endurance characteristics of such elements.

It is another object of this invention to provide a vibration test unit capable of producing stress reversals on specimen elements to be tested for endurance.

It is a further object of this invention to provide a vibration test unit capable of producing an eccentric motion on test elements in adjustable degrees of eccentricity.

It is a still further object of this invention to provide spindle means journaled in a stationary member and adjustably coupled to the inner race of a roller bearing element to adjust the eccentricity of the spindle means with respect to the roller bearing, the outer race of the roller bearing being fixed in a table top element supported on the stationary member by flexible rods, and the table top element and stationary member having means for detachably coupling specimen elements for vibration fatigue testing such that one end of each of the specimen elements to be fatigue tested is vibrated in a circular path while the other end of each of the specimen elements remains stationary until rupture or breakage occurs.

It is still another object of this invention to provide a vibration test unit for holding tubing and tubing couplings to be fatigue tested and producing a circular motion between respective ends of the tubing and couplings while the tubing and couplings are under fluid pressure.

Figure 2:
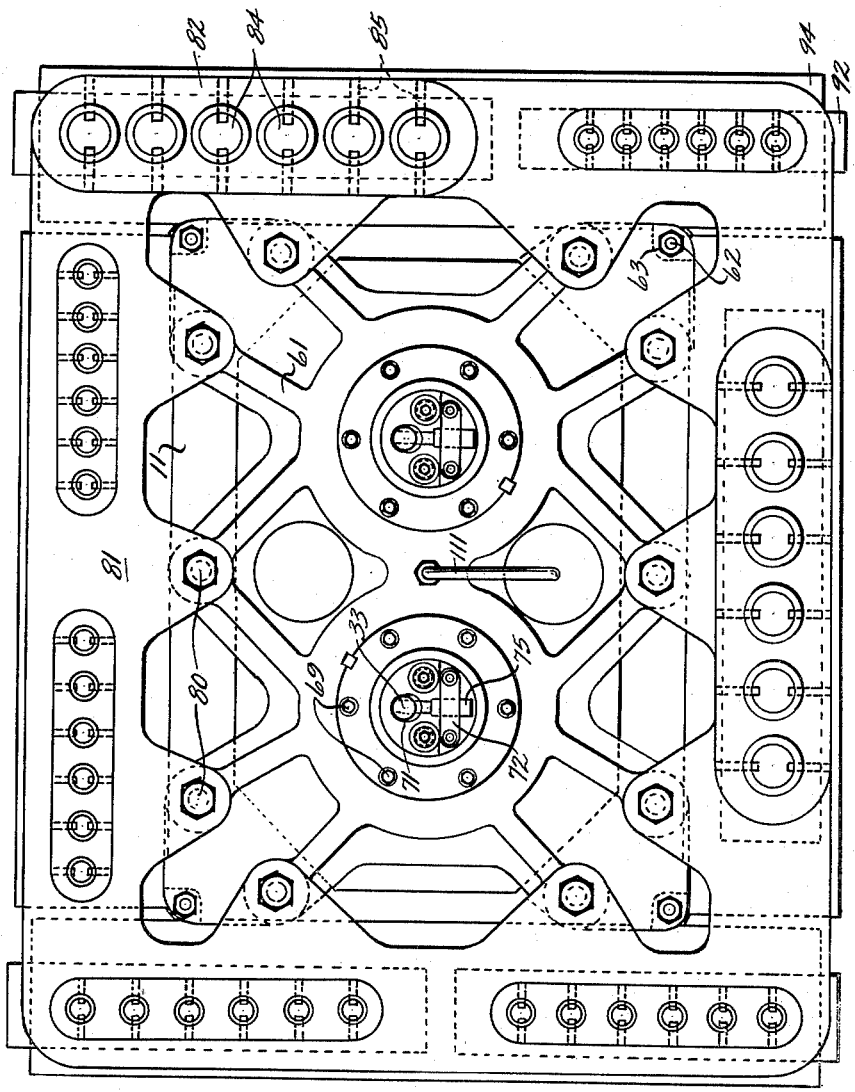

These and other objects and advantages will become more apparent as the description proceeds when taken in conjunction with the accompanying drawings, in which:

Fig. 1 is a side view of the vibration test unit shown partly in elevation and partly in section; and Fig. 2 is a top plan view of the unit with the eccentric mechanism covers removed.

In the drawings, in which similar characters of reference are employed to denote corresponding parts throughout the several views, 10 denotes a mounting member or base member which is adapted to be securely fastened to a solid surface or embedded in a suitable concrete block (not shown). A hollow rectangular housing 11 is mounted on the base 10 by cap screws 12. On the top surface of the housing 11 rests a spindle housing 13 secured by cap screws 14.

Spindle housing 13 has two similar bores 15, only one of which is shown in section, in each of which is rotatably supported a spindle 16 by two tapered roller bearings. The tapered roller bearing 17 at the top of the spindle 16 has its inner race member pressed on the spindle at a shoulder 18 formed by two different diameter cylindrical portions 19 and 20 of the spindle 16 while the outer race member slip fits in a counter bore 21 of the bore 15 near the top of the spindle housing 13. The tapered roller bearing 25 on the lower end of the spindle 16 has the inner race member slip fitted on a cylindrical portion 26 of the spindle 16 and the outer race member slip fitted in a bore 27 of the spindle housing which is smaller than the bore 15 and concentric thereto. The upper tapered roller bearing outer race member is held in the counter bore 21 by a cap member 30 secured by cap screws 31. The cap member 30 has an opening 32 through which the cylindrical portion 20 of the spindle 16 projects. Secured in the top end of the spindle 16, as by screw threading or press fitting, is a pin 33 which is set eccentric to the longitudinal axis of the spindle 16.

The outer race member of the lower tapered roller bearing 25 is held in the bore 27 by a plate 35 secured by cap screws 36 threaded into the bottom surface of the spindle housing 13. A spacer member 37 fits over the spindle 16 between the inner race members of both the tapered roller bearings 17 and 25 to maintain these inner race members in proper position for the corresponding outer race members in accordance with good engineering bearing operation principles. To adjust the roller bearing tightness, shims 38 may be used under the cap 30, the number or thickness of which determines the tapered roller bearing running tightness. The inner race member and the spacer member 37 are held against downward movement by a nut 40 threaded on the lower end of the spindle 16 which presses against a spur gear 41 that is keyed to the spindle at 42 and the spur gear 41 forces a collar 43, splined or otherwise nonrotatably slidable on the spindle 16, against the inner race member of a lower tapered roller bearing 25.

Spur gear 41, and a companion spur gear 45 driving the second spindle (not shown), are driven by a spur gear 46 keyed on a drive shaft 47 that is journaled in the spindle housing 13 by two tapered roller bearings 48 and 49. The upper tapered roller bearing 48 has the outer race member thereof fitted in a counterbored recess 50, the tapered roller bearing 48 and gear 46 being spaced and secured by a sleeve 51 and nut 52, respectively, in a manner similar to the assembly of the spindle shaft 16. The lower tapered roller bearing 49 has the outer race member supported in an opening 53 of a spindle subhousing 54 bolted or otherwise removably fastened to the underside of the spindle housing 13 to provide a gear chamber 55. The tapered roller bearing 49 is held in position by a cap 56 having a sealing ring 57 therein to fluidly seal the gear chamber 55 from the exterior. Shims may be used under the cap 56 to provide bearing tightness adjustments. The drive shaft 47 is herein illustrated as having a pulley 58 keyed thereon to be driven by a plurality of V-type belts although a flat pulley, sprocket, gear, or coupling for direct drive from a power motor may be used as desired.

Fastened to the top surface of the caps 30 and circling the upper ends of the two spindles 16 is a pan 60 the function of which will later be described. Over the pan 60 is a top plate 61, referring to both Figs. 1 and 2, that is supported by four rods 62 equidistantly spaced about the top plate which are threaded into the housing 11. The rods 62 pass through drilled openings in the top plate 61 and have opposed nuts 63 holding the top plate in position. Due to the length of the rods 62, the top plate 61 may be forced laterally in a direction with respect to housing 11 by flexing the rods 62.

The top plate 61 has two openings 65, only one of which is shown in Fig. 1, that correspond in their center-to-center positions to the two spindles 16. In each opening 65 is positioned a roller bearing, generally referred to by the reference character 66, that consists primarily of a composite outer race element of two rings 67 and 68 each having a ball race therein and held together by stud bolts 69. The inner race member 70 has a short eccentrically positioned radial slot 71 opening therethrough receiving the pin 33. An adjustment bar 72 is fastened to the inner race member 70 at right angles to the slot 71 by cap screws 73. An adjustment screw 75 having two different threaded diameter portions is threaded through threaded openings in the adjustment block 72 and the pin 33, the larger diameter threaded portion being in the adjustment block while the smaller threaded portion is in the pin 33. The two threaded portions are of different pitch such that rotation of the adjustment screw 75 will produce relative movement between the inner race member 70 and the pin 33 amounting to the difference in pitch of the two threaded portions providing a delicate adjustment of the eccentricity of the inner race member 70 with respect to the axis of the spindle 16. A cover 76 is demountably positioned over each opening 65 to seal the eccentric mechanism against dirt and other foreign matter.

Supported by bolts 80 about the periphery of the top plate 61 is a specimen supporting plate 81 having portions 82 for receiving tube adapters 83 that have neck portions 84 slidable in openings in the plate portions 82. Pins 85 in the plate portions 82 ride in slots along the neck portions 84 of the tube adapters to prevent rotation of these adapters during machine operation. Specimen tubes 90 are attached to the adapters 83 by couplings 91 which may also be specimens for test along with the tube specimens. The lower ends of the specimen tubes 90 are attached to adapter manifolds 92 by specimen couplings 93 as desired, the adapter manifolds being mounted on brackets 94 in any well known manner. The brackets 94 are adjustable for height along the side walls of the housing 11 by bolts 95 having their heads slidable in T-slots in the housing 11 in a well known manner. The adapter manifolds 92 have passages 96 connecting all the specimens and are adapted to be connected to a fluid pressure source for testing specimens under pressure simulating the pressure conditions of such specimens in actual practice. As best viewed in Fig. 2, a number of assorted sizes and specimens may be tested in one operation.

In order to lubricate the machine, oil under pressure from a source (not shown) is admitted through a fluid conduit 100, passes upward through the fluid conduit 101 in the base member 11, and passes through fluid conduits and passages 102, 103 through the tapered roller bearing 48 to the gear chamber 55. The oil then passes through a bore 104 within each spindle 16 and also through the bearings 25 through the chamber formed between the bore 15 and spacer 37 to the bearing 17. Oil from this latter path then passes through a hole 105 which communicates with the bore 104. From the bore 104 oil passes through holes 106, 107, 108, 109 and 110 to be returned to the source through the fluid conduits 111, 112, 113 and a sump return pipe (not shown). Joints in the path of the oil flow are suitably packed as at 114, 115, 116 and 57. The drip pan 60 catches any oil that leaks through the upper roller bearings 66 and returns it to the return conduit 113 by means of the drain tube 117.

In operation, the pulley 58 is belted to a power motor and the oil conduits 100 and 113 are connected to a lubrication supply system. Various sizes of specimen conduits and couplings 90, 91 and 93 are connected to the adapters of the several specimen plate portions and adapter manifolds. The manifolds may be subjected to fluid under pressure as desired. The two adjusting screws 75 are rotated to produce a desirable degree of eccentricity that the specimens are to be vibrated. It is to be noted that the eccentricity of both inner race members 70 with respect to the corresponding spindles 16 must be of like amount in order to avoid binding when the spindles are rotated. While a device with one spindle may be used, it is preferable to use two spindles to avoid a rotative moment of force being produced on the top plate 61.

It may be readily seen that a rotation of the drive shaft 47 will cause a rotation of both spindles 16 to move the top plate 61, and consequently the specimen supporting plate 81, in a circular manner, the circle described by any point on these plates being of a radius equal to the eccentric relation of the inner race member 70 with respect to the corresponding spindle 16. The upper portion of the specimen tubes and couplings 90, 91 will describe a circular path whereas the lower end of the tubes 90 and the couplings 93 will remain stationary. This results in the specimen tubes assuming an S bend and, because of the circular motion, there will be a reversal of stress about the entire diameter of the tube at the point where it is gripped by each of the specimen test couplings and in this manner a fatigue test by reversal of stress is attained on each of the tubes and coupling joints. Failure of these specimen tubes and couplings under fluid pressure will show leakage while those tested in the absence of fluid pressure may be observed for failure by the use of optical viewing instruments. Failure of a test specimen may also be detected by noting a sudden change in the pitch of vibration discernible by ear. Stress reversals on specimen tubings and couplings more nearly simulate stress reversals of such tubings and couplings in actual practice whereby more accurate endurance estimates can be made.

While the vibration test unit has been particularly illustrated and described for testing specimen tubing and couplings, it is to be understood that various other specimen forms may be tested, as rods, cables, and the like, and various modifications and changes may be made in the structure and details without departing from the spirit and scope of this invention. It is to be understood that I desire to be limited in my invention only by the spirit and scope of the appended claims.

I claim:

1. A vibration test unit for fatigue testing specimen machine elements comprising; a base member; a top plate, means supporting said top plate on one surface of said base member including flexible rods permitting said top plate to be moved a limited distance in any direction in substantially one plane; spindle means journaled in said base member and adapted to be rotated by power means, said spindle means having adjustable eccentric coupling means coupling said spindle means to said top plate for producing a circular vibration of said top plate; and means on said top plate and said base member for holding specimen machine elements to be fatigue tested whereby the specimen machine elements having the ends attached to said top plate are vibrated in a circular path with respect to the ends attached to said base member to produce a reversal of stress throughout 360° of the specimen machine elements.

2. A vibration test unit as set forth in claim 1 wherein said means on said base member for supporting one of the ends of the specimen machine elements are blocks adjustable along the sides of said base member in a direction toward said top plate to accommodate specimen machine elements of different lengths.

3. A vibration test unit as set forth in claim 2 wherein said blocks have passages therein connecting the holding means of the specimen elements and adapted to be supplied with fluid under pressure for vibration testing specimen tubular elements under pressure conditions.

4. A vibration test unit for fatigue testing tubing and tubing coupling specimens comprising; a base member; a top plate; means supporting said top plate over said base member including flexible parallel rods secured to said base member to permit said top plate to be vibrated in a plane substantially normal to said supporting rods; at least one spindle journaled in said base member substantially parallel to said supporting rods and adapted to be driven by motor power means, the ends of each spindle adjacent said top plate having an eccentric pin rotatably connected to said top plate for transmitting a circular vibratory motion thereto upon spindle rotation; threaded blind bores on the under side of said top plate for coupling one end of specimen tubings to be tested; and blocks adjustable to specimen length supported on said base member having threaded bores therein for coupling the other ends of the specimen tubings, the threaded bores in said blocks adapted to be connected to fluid under pressure whereby specimen tubings have one end of each thereof moved in a circular path with respect to the corresponding other ends thereof while the specimen tubings are under fluid pressure.

5. A vibration test unit as set forth in claim 4 wherein the pin connection of each spindle and said top plate consists of a roller bearing having inner and outer race members, the outer race member thereof being held by said top plate and the inner race member thereof having a radial slot through which said pin extends; an adjustable screw means having two sets of threads of different pitch, the threaded portion of one pitch being threaded through said pin and the threaded portion of the other pitch being threaded through an upstanding portion of said inner race member whereby rotation of said adjustable screw means will vary the eccentricity of the inner race member with respect to said spindle to vary the radius of the circular path described by said top plate.

6. A vibration test unit as set forth in claim 5 wherein the tubings to be tested are coupled in the threaded bores of said blocks and said top plates by tube couplings whereby the specimen tubings and tube couplings are subjected to vibration to determine their endurance.

EMMETT C. HARTLEY.

REFERENCES CITED

The following references are of record in the file of this patent:

UNITED STATES PATENTS

| Number | Name | Date |
| --- | --- | --- |
| 1,512,063 | Sproull | Oct. 21, 1924 |
| 1,595,318 | Shields | Aug. 10, 1926 |
| 1,667,401 | Stockmeyer | Apr. 24, 1928 |
| 2,412,524 | Mallory | Dec. 10, 1946 |
| 2,453,023 | L'Hehmite | Nov. 2, 1948 |